United States Patent [19]
Fujiwara et al.

[11] 4,031,496
[45] June 21, 1977

[54] VARIABLE INDUCTOR

[75] Inventors: Hideo Fujiwara, Tachikawa; Yukio Ichinose, Kokubunji; Satoshi Taniguchi, Tokorozawa; Tsutomu Kobayashi; Kazuo Ichino, both of Tokyo; Michiyasu Itoh, Kodaira; Yasutaro Uesaka, Hachioji; Fumiyuki Inose, Kokubunji; Sadayasu Ueno, Katsuta, all of Japan

[73] Assignee: Hitachi, Ltd., Japan

[22] Filed: July 3, 1974

[21] Appl. No.: 485,626

[30] Foreign Application Priority Data

July 6, 1973 Japan ............................ 48-76808
July 6, 1973 Japan ............................ 48-76809
July 6, 1973 Japan ............................ 48-76811

[52] U.S. Cl. ............................. 336/135; 336/134
[51] Int. Cl.² ...................................... H01F 21/06
[58] Field of Search .......... 336/135, 134, 130, 132, 336/133, 117, 118, 119, 120, 83; 323/51, 52

[56] References Cited
UNITED STATES PATENTS

| 2,585,050 | 2/1952 | Simon | 336/120 |
| 2,609,531 | 9/1952 | Kirchner | 336/135 X |
| 2,730,664 | 1/1956 | Karlson | 336/135 X |
| 2,838,737 | 6/1958 | Duncan | 336/120 |
| 3,146,418 | 8/1964 | Maeda | 336/135 X |
| 3,155,931 | 11/1964 | Maeda | 336/135 X |
| 3,280,396 | 10/1966 | Beck et al. | 336/134 X |
| 3,382,472 | 5/1968 | Maass | 336/119 |
| 3,436,706 | 4/1969 | Siff et al. | 336/134 |
| 3,437,969 | 4/1969 | Pfanzelt | 336/135 X |
| 3,550,053 | 12/1970 | Carlo | 336/135 X |

FOREIGN PATENTS OR APPLICATIONS

275,253  8/1951  Switzerland ................ 336/120

*Primary Examiner*—Thomas J. Kozma
*Attorney, Agent, or Firm*—Craig & Antonelli

[57] ABSTRACT

A variable inductor wherein two closed magnetic circuits each having a predetermined gap in one place are constructed of a movable magnetic core and a fixed magnetic core. When the movable magnetic core is moved, the opposite area between both the magnetic cores in one of the closed magnetic circuits increases, while the opposite area between both the magnetic cores in the other closed magnetic circuit decreases. Thus, the inductances of coils wound around parts of the respective closed magnetic circuits vary complementarily.

11 Claims, 20 Drawing Figures

VARIABLE INDUCTOR

BACKGROUND OF THE INVENTION

1. Field of the Invention

This invention relates to a variable inductor in which the inductances of two coils vary complementarily in response to the displacement of a movable member. More particularly, it relates to a variable inductor which is used in, for example, a displacement-electricity transducer for converting the angular displacement of a throttle valve in an automobile or the like into an electric signal.

2. Description of the Prior Art

In recent years, with the development of the automobile industry, the exhaust gas emitted from the automobile engine has become a major social problem as a source of environmental hazards. It is, therefore, necessary to clean the exhaust gas by any method. As a temporary expedient, the catalysis method is considered.

As a radical measure, however, the development of a clean engine is needed. It is thought the first essential to clean the exhaust gas by controlling the explosion within the engine.

To this end, the rotary engine, etc., have been developed and are being put into practical use as the clean engines. These engines, however, are not perfect, either. In order to control the explosion itself so that the exhaust gas can be always kept completely clean, it is further required to adopt a centralized control system based on an electronic circuit arrangement including a minicomputer. In other words, in order to solve the problem of air pollution ascribable to the exhaust gas of the automobile, it is desirable that all the parts of the automobile can be electronically subjected to the centralized automatic control. In order that, as one measure for achieving the purpose, the amounts and proportions of fuel and air to be supplied into the engine may be maintained at the optimum states, it is earnestly requested to realize an electronic detection and control device which monitors and controls a fuel injector and an air intake controller for the engine. Especially, a device which accurately detects the displacement of a throttle valve for regulating the amounts of fuel and air in the automobile engine is earnestly requested.

Regionally, the automobiles are used extensively over cold districts to tropical districts. Further, the difference between temperatures at the starting and the steady running of the engine is large, and the service temperature range is as wide as −40° C. to +120° C. Regarding the environmental conditions of use, the automobiles are naturally placed under very severe conditions besides bad roads, dust, rain, and snow. The displacement detection device for use in the automobile engine need accordingly be a structure in which thermal resistance, vibration resistance, moisture resistance, corrosion resistance, etc., are carefully taken into consideration and which is capable of a high sensitivity detection of the displacement. Moreover, the displacement detection device need be simple in the structure in order to be inexpensive in production, and need be endurable in order to detect the displacement, frequently changing because of the use, repeatedly several million times.

As a device for detecting the amounts of fuel and air to be sucked into the engine of the automobile or the like, a number of devices relying on mechanical detection methods have heretofore been put into practical use. However, they are complicated in mechanism, and it is difficult to say that they attain a satisfactory precision. On the other hand, when a prior art displacement-electricity transducer is used as the detector without any modification, there are problems in points of the service temperatures of from −40° to 120° C., the endurability and the precision.

For example, when the displacement of frequent changes is converted into an electric signal by the use of a variable resistor, there is the disadvantage that, on account of the friction between a resistance body and a slider, the resistance body wears away to become unusable.

SUMMARY OF THE INVENTION

An object of this invention is to eliminate the disadvantages of the prior arts and to provide a variable inductor which can convert a displacement into a change of inductance with a simple structure.

Concretely speaking, the object is to provide a variable inductor which can detect a displacement at very high sensitivity and simply over a long term of use when the angular displacement is large and the service temperatures are of a wide range.

In order to accomplish the object, the variable inductor of this invention consists in a construction in which a movable magnetic core and a fixed magnetic core are oppositely arranged so as to define predetermined gaps in at least two places, essentially two magnetic circuits each including at least one gap are formed by both the magnetic cores, and a coil is wound around a part of each magnetic circuit, so that when the movable magnetic core is displaced relative to the fixed magnetic core with a predetermined spacing held therebetween, the essential opposite area of the gap portion in one closed magnetic circuit may increase, while the essential opposite area of the gap portion in the other closed magnetic circuit may decrease.

With such construction, the movable magnetic core is substantially in non-contact with the fixed magnetic core. Therefore, no friction occurs, and several million times of repeated displacement detections become possible. Moreover, since the increment and decrement of the essential opposite areas of the respective gaps in the two closed magnetic circuits are substantially equal, the sum of the inductances of the two coils can be kept constant irrespective of the displacement of the movable magnetic core. That is, a variable inductor which can be used like a potentiometer is realizable. If the gap is made an air gap, the variable inductance is difficult to be affected by a temperature change because the temperature dependency of the permeability $\mu_o$ of the air gap is low.

Another object of this invention is to provide a displacement-electricity transducer by combining the foregoing variable inductor with a rectangular wave oscillator.

The rectangular wave oscillator does not change in the amplitude of its output unless a supply voltage fluctuates even when the ambient temperature changes. The transducer is therefore advantageous in being insusceptible to a temperature change.

BRIEF DESCRIPTION OF THE DRAWINGS

FIG. 3 is an inductance-versusdisplacement characteristic diagram of the device shown in FIGS. 1 and 2;

FIG. 8 is a schematic view showing another embodiment of this invention, while

FIG. 18 is a circuit diagram of a displacement detector employing the device of this invention, while

GENERAL PART OF THE INVENTION

Figure 1:
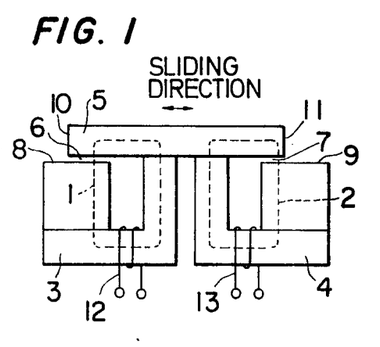
FIGS. 1 and 2 are a side view and a top view showing the principle construction of the device of this invention, respectively.
Figure 2:
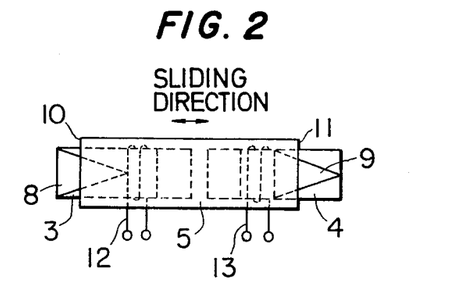

The principle of this invention will be explained in conjunction with FIGS. 1 and 2. In the figures, numerals 1 and 2 represent closed magnetic paths, respectively. Numerals 3, 4, and 5 designate magnetic cores which are made of a material of high permeability and which serve to form the magnetic paths. The movable magnetic core 5 can be slid relative to the fixed magnetic cores 3 and 4 in the direction of arrows in the figures. Gaps 6 and 7 exist in the magnetic paths 1 and 2, respectively. The opposing surface 8 of the fixed magnetic core 4 to the movable magnetic core 5 and that 9 of the fixed magnetic core 4 to the movable magnetic core 5 are shaped into triangles in this example, which triangles are congruent with each other. Of course, any shape other than the triangle may be used. The opposing surface of the movable magnetic core 5 to the fixed magnetic cores 3 and 4 is made flat. The side ends 10 and 11 of the movable magnetic core 5 are adapted to always come to equal positions with respect to the triangles of the opposing surfaces 8 and 9.

Coils 12 and 13 are wound around parts of the magnetic paths 1 and 2, respectively.

Figure 3:
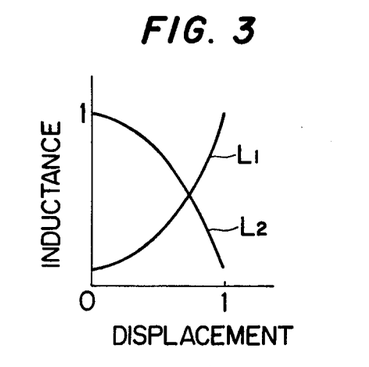

Where, with such construction, the movable magnetic core 5 is slid relative to the fixed magnetic cores 3 and 4 in the direction as shown, the variations of the inductances $L_1$ and $L_2$ of the respective coils 12 and 13 versus the displacement of the movable magnetic core 5 are depicted as in FIG. 3. In this case, the sum between the essential opposite area of the opposing surfaces of the fixed magnetic core 3 and the movable magnetic core 5 and that of the opposing surfaces of the fixed magnetic core 4 and the movable magnetic core 5 is always held constant irrespective of the displacement of the movable magnetic core 5, and hence, the value of $(L_1 + L_2)$ is also kept substantially constant. When the coils 12 and 13 are connected in series and an A.C. signal is applied across the series connection, a voltage of a magnitude corresponding to the displacement of the movable magnetic core 5 appears between both the terminals of either coil 12 or 13. Thus, the displacement-electricity conversion can be effected. Here, the fact that the sum of the inductances $L_1$ and $L_2$ of the respective coils 12 and 13 is always constant signifies that no electrical influence is exerted on the A.C. signal source side even when the movable core 5 is displaced. This is very convenient in constructing a displacement-electricity transducer. An inductor in which, as described above, the inductance between the terminals for applying the A.C. input signal is kept substantially constant independent of the displacement of the movable member and the inductance between the output terminals varies in correspondence with the displacement of the movable member, will be termed the "potentiometric inductor" in order to facilitate the following explanation.

Figure 4:
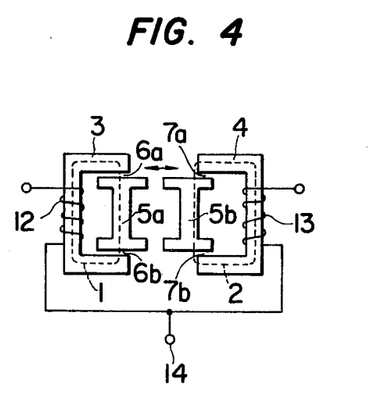
FIG. 4 is a schematic view of another construction for explaining the principle of this invention.

Referring now to FIG. 4, description will be made of the principle of the potentiometric inductor having a construction different from the foregoing.

In the figure, movable magnetic cores 5a and 5b move in interlocking while keeping fixed gaps to the inner surfaces of U-shaped fixed magnetic cores 3 and 4. They are constructed so that, when the opposite area between the mutually opposing magnetic cores on one side increases, the opposite area between the mutually opposing magnetic cores on the other side may decrease. Coils 12 and 13 are wound around the respective fixed magnetic cores 3 and 4. One end of the coil 12 and that of the coil 13 are commonly connected at a terminal 14.

When the device is constructed so as to surround the movable magnetic cores 5a and 5b by the fixed magnetic cores 3 and 4 in this manner, the movable magnetic cores 5a and 5b and the gaps become difficult to be subject to external magnetic influences. In addition, the inductor of a structure strong against vibrations, etc., is obtainable.

Now, let $N_1$ and $N_2$ be the numbers of turns of the coils 12 and 13, respectively, $l_1$ and $S_1$ be the effective magnetic path length and the sectional area of the magnetic cores 3 and 5a forming the magnetic path 1, respectively $l_2$ and $S_2$ be the effective magnetic path length and the sectional area of the magnetic cores 4 and 5b forming the magnetic path 2, respectively, $g_1$ and $g_2$ be the widths of the gaps 6a, 6b and 7a, 7b, respectively, $S_1'$ and $S_2'$ be the opposite areas of the mutually opposing magnetic cores, respectively, and $\mu$ be the permeability of the respective magnetic cores. Then, the inductances $L_1$ and $L_2$ of the respective coils 12 and 13 are represented by the following equations:

$$L_1 = \frac{N_1^2}{\frac{l_1}{\mu S_1} + \frac{g_1}{\mu_0 S_1'}} \quad (1)$$

$$L_2 = \frac{N_2^2}{\frac{l_2}{\mu S_2} + \frac{g_2}{\mu_0 S_2'}} \quad (2)$$

where $\mu_0$ denotes the permeability of vacuum. Assuming here:

$$\mu >> \mu_0 \frac{l_1 S_1'}{g_1 S_1}$$

-continued $$\mu >> \mu_0 \frac{l_2 S_2'}{g_2 S_2}$$

then $$L_1 \simeq \frac{N_1^2 \mu_0 S_1'}{g_1} \qquad (3)$$

$$L_2 \simeq \frac{N_2^2 \mu_0 S_2'}{g_2} \qquad (4)$$

Accordingly, if the movable magnetic cores 5a and 5b are moved so that, as previously stated, when the opposite area $S_1'$ between the magnetic cores on one side increases, the opposite area $S_2'$ between the magnetic cores on the other side may decrease, then the value $(L_1 + L_2)$ become substantially constant and the potentiometric variable inductor can be realized.

PREFERRED EMBODIMENTS OF THE INVENTION

Figure 5:
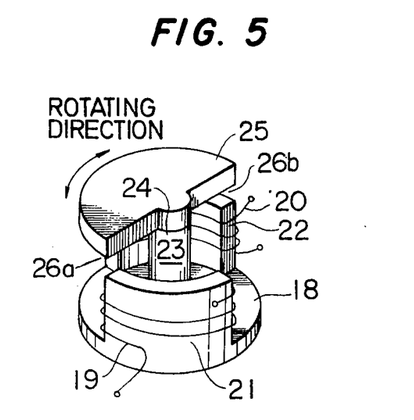
FIGS. 5 and 6 are a schematic perspective view and a top view showing an embodiment of the device of this invention, respectively.
Figure 6:
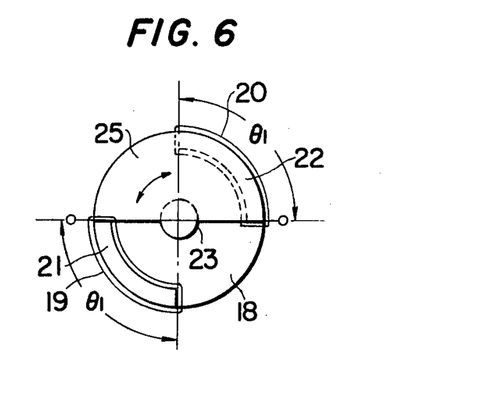

In FIGS. 5 and 6 showing an embodiment of this invention, numeral 18 designates a fixed magnetic core which is made of magnetic material, such as ferrite, in the shape of a pot partially cut away. In the fixed magnetic core 18, coils 19 and 20 are wound around projecting parts 21 and 22, respectively. The angles of the projecting parts 21 and 22 on the periphery of the fixed magnetic core 18 as viewed from the center of the fixed magnetic core 18 are equal to each other (the angular measure is denoted by $\theta_1$). A columnar part 23 is provided at the center of the magnetic core 18. A rotor 25 made of magnetic material such as ferrite is provided in the closest possible proximity to the fore end 24 of the columnar part 23, and it is rotatable with its axis at the columnar part 23 of the magnetic core 18. The rotor 25 is semicircular or sectorial in shape, and has a radius substantially equal to that of the fixed magnetic core 18. The extending angle of the rotor 25 is substantially equal to an angle at which the centers of the two projecting parts 21 and 22 of the core 18 are viewed from the center of the fixed magnetic core 18 (the angular measure is denoted by $\theta_2$). The rotational center portion of the rotor 25 is made close to the upper end 24 of the columnar part 23 being the center portion of the fixed magnetic core 18 as far as possible, so as to establish the lowest possible magnetic reluctance between them. Thus, the mutual inductance between the coils 19 and 20 is reduced as far as possible.

Figure 7:
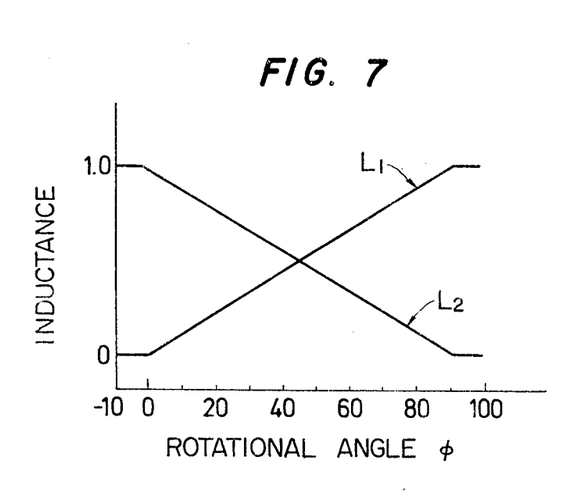
FIG. 7 is an inductance-versus-angular displacement characteristic diagram of the device shown in FIGS. 5 and 6.

Gaps 26a and 26b between the rotor 25 and the fore ends of the respective projecting parts 21 and 22 on the periphery of the fixed magnetic core 18 are held constant. At this time, the gaps 26a and 26b are made sufficiently smaller than the thickness of the projecting parts 21 and 22 on the periphery of the fixed magnetic core 18, and are made larger than the gap (including zero) between the rotor 25 and the fore end part 24 of the columnar part 23 of the fixed magnetic core 18. FIG. 7 shows the dependency of the inductances $L_1$ and $L_2$ of the respective coils 19 and 20 on the rotational angle $\phi$ of the rotor 25 at the time when $\theta_1$ is 90° and $\theta_2$ is 180°. Except the close proximity to $\phi = 0°$ and $\phi = 90°$, the inductances $L_1$ and $L_2$ vary linearly with $\phi$ in a range of $\phi$ from 0° to 90°. It is not very difficult that the deviation from the straight line is made below 1% of the maximum value of the inductance.

Although $\theta_1 = 90°$ and $\theta_2 = 180°$ in the above embodiment, the angles $\theta_1$ and $\theta_2$ can, of course, be selected at arbitrary values as may be needed.

Although, in the above embodiment, the respective inductances $L_1$ and $L_2$ have been explained as varying linearly with the rotational angle of the rotor 25, the manner of the variations of the inductances relative to the rotational angle of the rotor 25 can be variously changed by variously transforming the opposing surfaces of the projecting parts 21 and 22, on which the coils 19 and 20 are wound, to the rotor 25.

Figure 8:
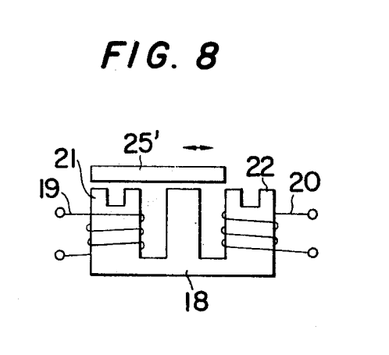
Figure 9:
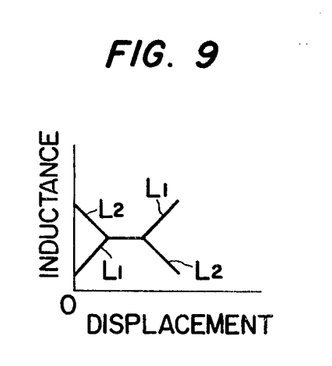
FIG. 9 is an inductance-versus-displacement characteristic diagram of the device shown in FIG. 8.

FIG. 8 shows an embodiment in which the pot-shaped core 18 is developed rectilinearly. When such device is employed, the respective inductances $L_1$ and $L_2$ vary as in FIG. 9 with the movement of a moving magnetic core 25' (corresponding to the rotor 25). With the embodiment shown in FIG. 8, the variable inductor of the characteristics in FIG. 9 is obtained by appropriately selecting the shape of the vertical section of the projecting parts 21 and 22. It will be apparent that potentiometric variable inductances of arbitrary characteristics are obtained by variously changing the shapes of the opposing surfaces of the moving magnetic core and the projecting parts of the fixed magnetic core. At this time, it is utilized that the shape of the opposing surface of the moving magnetic core 25' to the fixed magnetic core can also be changed.

Although, in the foregoing embodiments, ferrite is used for the magnetic cores opposing to each other, any of the so-called high permeability materials may be employed.

Figure 10:
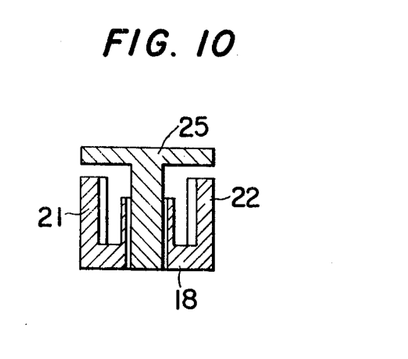
FIGS. 10 and 11 are sectional views showing examples of the construction of magnetic cores in this invention.
Figure 11:
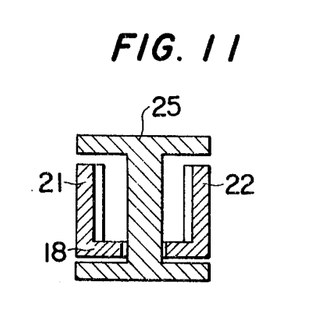

By constructing the rotor 25 and the fixed magnetic core 18 as shown in FIG. 10 or FIG. 11 and thus enlarging the opposite area at the central part between both the magnetic cores, the mutual induction between the coils 19 and 20 can be held weak even when the gap between the opposing surfaces at the central part is made sufficiently large.

Another embodiment of this embodiment of this invention will now be described with reference to FIGS. 12, 13, and 14.

In this embodiment, parts of two magnetic paths are made common into columnar shafts 23 and 27, and two magnetic cores 18 and 25 are oppositely arranged. Those surfaces 28 and 29 of the projecting parts 21 and 22 of the magnetic core 18 which oppose to the magnetic core 25 have such shape that, as illustrated in FIG. 14, each is surrounded by concentric circular arcs of different radii and two straight lines passing through the center. The projecting parts 21 and 22 are arranged at positions of the 180° rotational symmetry with the center at the columnar shaft 23. Likewise, the opposing surface of the magnetic core 25 to the magnetic core 18 has a shape surrounded by concentric semicircles of different radii and two straight lines passing through the center. The magnetic cores 18 and 25 are constructed so that one of them can be rotated relative to the other with the center at the shafts 23 and 27. In this case, the shafts 23 and 27 forming the common magnetic path are contacted as closely as possible so that the magnetic reluctances of the two magnetic paths may be chiefly determined by the magnitudes of the essential opposite areas between the opposing surfaces 28 and 29 of the magnetic core 18 and the opposing surface of the magnetic core 25. In this respect, however, some gap must sometimes be provided between the shafts 23 and 27 in order to prevent abrasion.

Figure 15:
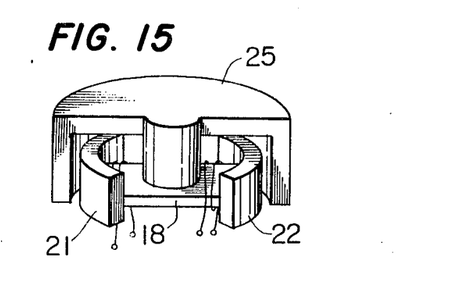
FIGS. 15 and 16 are a schematic perspective view and a bottom view showing yet another embodiment of this invention, respectively.
Figure 16:
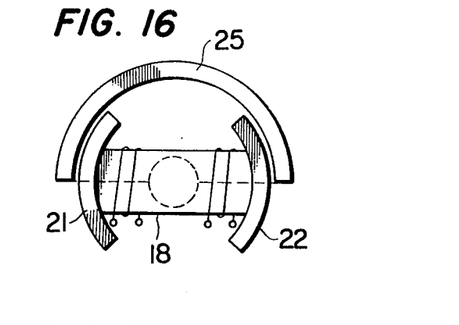

Although, in the embodiment, two magnetic cores are arranged so that their opposing surfaces may be held on parallel planes, slide type potentiometric variable inductances having the same effect can also be obtained by arranging them on concentric cylindrical surfaces of different radii. A model-like sketch and a bottom view of such embodiment are shown in FIGS. 15 and 16, respectively. Numerals 18 and 25 indicate the magnetic cores made of a high permeability material. The projecting parts 21 and 22 having opposing surfaces which are congruent with each other.

Figure 17:
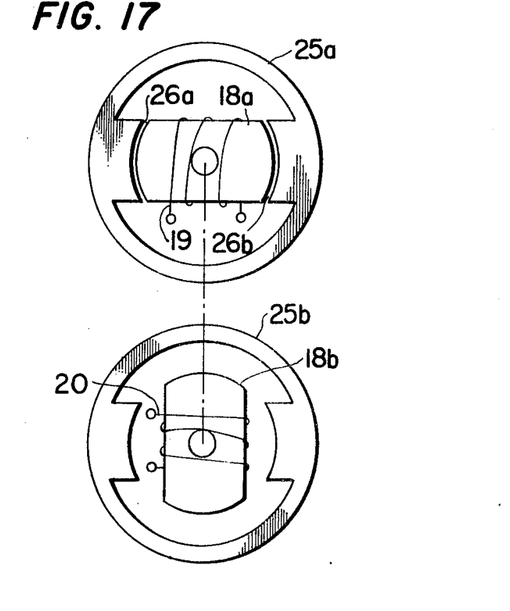
FIG. 17 is a schematic view showing a further embodiment of this invention.

FIG. 17 is a view of still another embodiment of the variable inductor of this invention. In the figure, 25a and 25b designate fixed magnetic cores which are made of a high permeability material such as ferrite and laminated metal product. Numerals 18a and 18b denote movable magnetic cores which are made of a similar material. Coils 19 and 20 are wound around the movable magnetic cores 18a and 18b, respectively, and their inductances vary with the rotations of the movable magnetic cores 18a and 18b. The variations of the inductances are substantially proportional to the essential opposite areas between the fixed magnetic cores 25a, 25b and the movable magnetic cores 18a, 18b which oppose to each other with intervening gaps 26a and 26b. The movable magnetic cores 18a and 18b are interlocked while keeping a spacial phase difference of 90° therebetween. Consequently, the inductances of the coils 19 and 20 fluctuate complementarily to each other, and the potentiometric inductor can be provided. Although, in the embodiment, the coils 19 and 20 are wound around the movable magnetic cores 18a and 18b, it is to be understood that the same effect is achieved by winding coils around parts of the fixed magnetic cores 25a and 25b.

Figure 12:
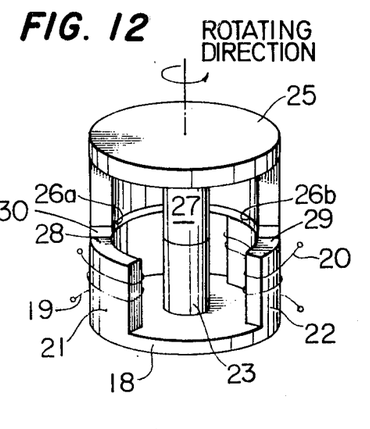
FIGS. 12, 13, and 14 are a schematic perspective view, a side view, and a top view showing still another embodiment of the device of this invention, respectively.
Figure 13:
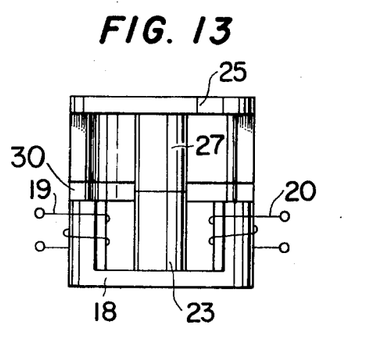
Figure 14:
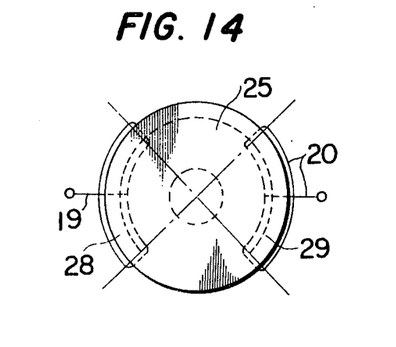

In the foregoing various embodiments, into the opposition gap between the fixed magnetic core and the movable magnetic core, there can be inserted a spacer 30, such as illustrated by example in FIGS. 12 and 13, of a material with which the concentration of magnetic reluctance takes place in the gap portion. Any non-magnetic substance other than the air may also be used insofar as its permeability is lower in comparison with the permeability of the magnetic cores.

A circuit of a displacement-electricity transducer employing the variable inductor of this invention will now be explained in conjunction with FIG. 18. In the figure, the output voltage of an astable multivibrator 31 is applied through a buffer amplifier 34 of an emitter follower to the input terminal of the variable inductor 32. The input terminal voltage is divided according to the displacement of the movable magnetic core of the variable inductor 32, whereupon the divided voltage is applied to the input terminal of an amplifier 33 having a high gain. The amplified output is rectified and smoothed by a rectifying and smoothing circuit 35 which is composed of a diode, capacitor, etc.

In this embodiment, the output of the oscillator 31 is divided according to the displacement of the movable magnetic core in the inductor and is rectified and smoothed. Therefore, in order that the displacement-output voltage characteristic may be difficult to be affected by temperature changes, an oscillator must be employed with which the output amplitude becomes constant against temperature changes. Usually, in case of using the active elements of an oscillator in an active region, the operating point is prone to shift due to a temperature change and the output amplitude is prone to change. This invention accordingly uses a rectangular wave oscillator, such as astable multivibrator, which has active elements operating in a saturation region and a cut-off region.

By negatively feeding-back a part of the output of the rectifying and smoothing circuit 35 to the amplifier 33 of the high gain G, the threshold value of the diode in the rectifier 35 can be reduced to 1/G in substance.

Figure 19:
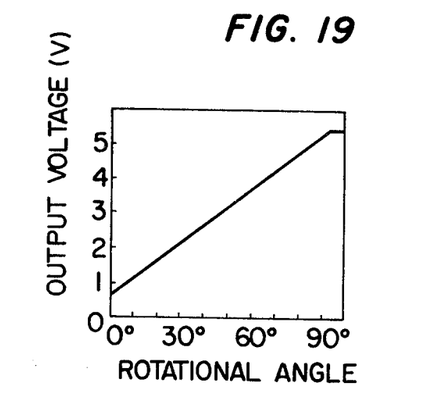
FIG. 19 is an output characteristic diagram of the displacement detector shown in FIG. 18.

FIG. 19 is a characteristic curve diagram of the output voltage versus the rotational angle of the movable magnetic core in the case where the circuit of the embodiment is used. As apparent from the figure, in accordance with the circuit of the embodiment, the relation between the output voltages and the rotational angles is substantially perfectly linear in a range of angular displacements 0° to 90°, and the rotational angle can be immediately known from the output. Although the linearity is influenced by the distortion of the opposing surfaces of the fixed and movable magnetic cores and the change of the duty ratio of the oscillating pulse width of the rectangular wave oscillator 31, it can be confined into an error range of ±0.5%. By employing a ferrite of a Curie temperature of 130° C. for the magnetic cores, the variation ascribable to temperatures can be suppressed within 1% in a temperature range of −40° C. to 120° C.

Figure 20:
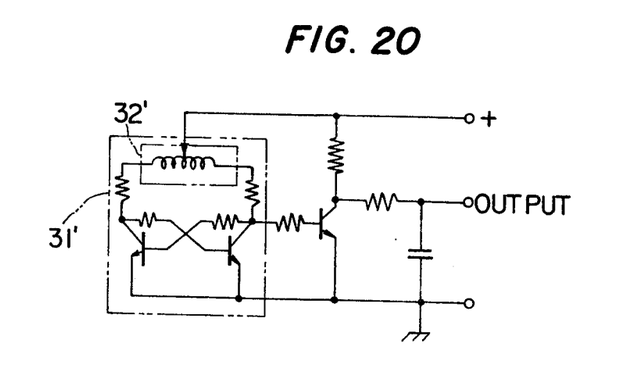
FIG. 20 is another circuit diagram of a displacement detector employing the device of this invention.

FIG. 20 shows another circuit of the displacement-electricity transducer. This circuit employs the variable inductor 32' as the oscillation time constant-determining element of the rectangular wave oscillator 31'. The ostillation pulse width of the oscillator varies according to the displacement of the movable magnetic core of the variable inductor 32'.

Figure 18:
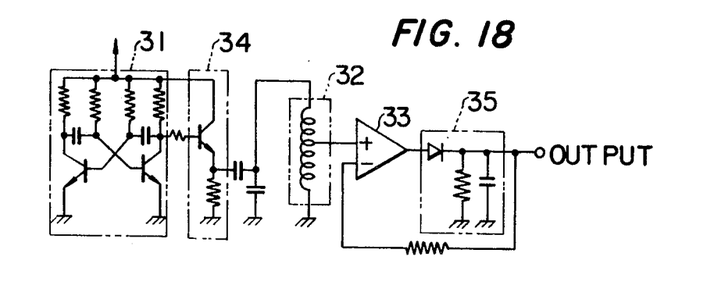

When the output is rectified and smoothed by the use of the rectifying and smoothing circuit 35 shown in FIG. 18, the characteristic of the output voltage versus the displacement of the movable magnetic core becomes substantially the same as in FIG. 19, and a very good linearity is exhibited.

As described above, in accordance with the device of this invention, the angular displacement or the straight displacement can be highly precisely and readily converted into the electric signal, and besides, the characteristic curve of the output voltage versus the displacement can be very easily made any desired curve. Since the device is sufficiently endurable, it is very useful in case of intending to perform various controls in response to the displacements of a throttle valve, etc. Furthermore, since the device is difficult to be influenced by the ambient temperature, it can be used as a device whose temperature range permitting a highly precise operation is as extraordinarily wide as − 40° C. to 120° C.

What is claimed is:

1. A variable inductor comprising
    movable magnetic core means;
    first fixed magnetic core means forming with said movable magnetic core means a first closed magnetic path;
    second fixed magnetic core means forming with said movable magnetic core means a second closed magnetic path;
    first coil means wound around a portion of said first closed magnetic path;
    second coil means wound around a portion of said second closed magnetic path;
    whereby the inductance of said first coil means varies in a complementary manner with the inductance of said second coil means such that the sum of said inductance of said first coil means and said inductance of said second coil means remains constant when said movable magnetic core means is removed relative to said first and second fixed magnetic core means, and magnetic core member means for joining said first fixed magnetic core means with said second fixed magnetic core means, said magnetic core member means having center columnar means projecting between said first and second fixed magnetic core means and providing a common magnetic path portion of said first and second closed magnetic paths, said movable magnetic core means being rotatably supported relative to said first and second fixed magnetic core means joined by said magnetic core member means about the longitudinal axis of said columnar means opposite parallel surfaces of said first and second fixed magnetic core means, and said movable magnetic core means being supported with respective constant gap portions from said opposite parallel surfaces of said first and second fixed magnetic core means, wherein as said movable magnetic core means is rotated about said longitudinal axis of said columnar means, the sum of the areas of the surfaces of said first and second fixed magnetic core means which face said movable magnetic core means remains constant and wherein said movable magnetic core means is magnetically coupled more closely at said center columnar means than at said gap portions;

wherein said magnetic core member means is disc-shaped, said first and second fixed magnetic core means are of arcuate shape and project axially of said magnetic core member means at respective edge portions thereof toward said movable magnetic core means and said movable magnetic core means is rotatably mounted parallel to said magnetic core member means; and wherein said movable magnetic core means comprises a substantially semi-circular shaped disc piece parallel to said magnetic core member means, wherein the longitudinal axes of said magnetic core member means and said columnar means coincide with the axis of rotation of said movable magnetic core means.

2. A variable inductor comprising:

a movable magnetic core and a fixed magnetic core, said magnetic cores being relatively disposed with respect to one another to provide at least two surface portions on each of said magnetic cores, said surface portions of respective magnetic cores being opposed and separated by respective predetermined constant gaps to form at least two closed magnetic circuits between said magnetic cores, each of said closed magnetic circuits including a common path portion and a respective one of said gaps, said magnetic cores being more closely coupled magnetically at said common path portion than at said gaps, wherein upon displacement of said movable magnetic core relative to said fixed magnetic core the opposing surface areas of said oppositely disposed surface portions across a first of said predetermined gaps increases, while the opposing surface areas of said oppositely disposed surface portions across a second of said predetermined gaps decreases; and a coil wound around a part of each of said two closed magnetic circuits;

wherein said fixed magnetic core comprises a circular disk of magnetic material, a columnar member of magnetic material extending from a surface of said circular disk at a central position of said circular disk, and at least two arcuate wall members extending from said surface, said arcuate wall members being disposed at edge portions of said circular disk and being symmetrically disposed relative to said central position; and wherein said movable magnetic core comprises a semicircular disk-like member of magnetic material having a central portion disposed relative to said columnar member for rotation of said semicircular disk-like member with respect to said fixed magnetic core, said surface portions of said movable magnetic core being portions of one surface of said semicircular disk-like member facing said arcuate wall members across said predetermined constant gaps, and said central portion of said disk-like member being closely magnetically coupled to said columnar member for minimizing magnetic reluctance between said magnetic cores.

3. The variable inductor according to claim 2, wherein the magnetic circuit of one of said magnetic cores at said opposing surface portions of said movable magnetic core and said fixed magnetic core is changed in correspondence with a variable inductance characteristic to be obtained.

4. A variable inductor according to claim 2, wherein said predetermined constant gaps between said semicircular disk-like member and said arcuate wall members is larger than a separation between said central portion of said semicircular disk-like member and said columnar member.

5. A variable inductor according to claim 2, wherein said arcuate wall members subtend substantially equal angles relative to said central position.

6. A variable inductor according to claim 5, wherein said substantially equal subtended angles are 90°.

7. A variable inductor according to claim 6, wherein said semicircular disk-like member has a radius substantially equal to the radius of said circular disk of said fixed magnetic core.

8. A variable inductor according to claim 7, wherein said predetermined constant gaps are substantially less than the thickness of said arcuate wall members.

9. A variable inductor according to claim 2, wherein respective coils are wound around each of said arcuate wall members.

10. A variable inductor according to claim 2, wherein a spacer of non-magnetic material is disposed within said predetermined constant gaps.

11. A variable inductor comprising:

first magnetic core means of magnetic material including a circular disk, at least two arcuate members extending from a surface of said disk, and a central columnar portion extending from said surface, said at least two arcuate members being disposed symmetrically with respect to said central columnar portion, second magnetic core means of magnetic material including a semicircular disk having a central portion disposed in proximity to said central columnar portion and surface portions provided in spaced opposition respectively from said at least two arcuate members across predetermined constant gaps, and at least one coil means wound around each of said arcuate members.

* * * * *